(12) United States Patent
Kurtz et al.

(10) Patent No.: US 6,545,610 B2
(45) Date of Patent: *Apr. 8, 2003

(54) PRESSURE TRANSDUCER AND SWITCH COMBINATION

(75) Inventors: Anthony D. Kurtz, Ridgewood, NJ (US); John R. Hayer, Woodcliff Lakes, NJ (US); Wolf S. Landmann, Fair Lawn, NJ (US)

(73) Assignee: Kulite Semiconductor Products, Inc., Leonia, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/318,144

(22) Filed: May 25, 1999

(65) Prior Publication Data

US 2002/0084906 A1 Jul. 4, 2002

(51) Int. Cl.[7] .............................................. G08B 21/00
(52) U.S. Cl. ...................... 340/626; 340/945; 340/963; 701/9; 454/70
(58) Field of Search ................................. 340/626, 945, 340/963, 971, 688; 701/9, 14; 244/1 R; 454/69, 70, 71, 74, 76

(56) References Cited

U.S. PATENT DOCUMENTS

| | | | | |
|---|---|---|---|---|
| 4,164,898 A | * | 8/1979 | Burgess et al. ............... 98/1.5 |
| 4,275,393 A | * | 6/1981 | Johnston ..................... 340/688 |
| 4,414,539 A | * | 11/1983 | Armer ......................... 340/500 |
| 4,417,231 A | * | 11/1983 | Watt ............................. 340/459 |
| 4,450,716 A | * | 5/1984 | Lefaucheux et al. ........ 73/146.5 |
| 4,553,474 A | * | 11/1985 | Wong et al. ................... 98/1.5 |
| 4,594,881 A | * | 6/1986 | Imamura ....................... 73/37.5 |
| 4,613,851 A | * | 9/1986 | Hines .......................... 340/688 |
| 4,706,908 A | * | 11/1987 | Huffman et al. ........... 244/118.5 |
| 4,823,117 A | * | 4/1989 | Burcham ...................... 340/426 |
| 4,858,620 A | * | 8/1989 | Sugarman et al. ........... 128/744 |
| 4,919,124 A | * | 4/1990 | Stevenson et al. ...... 128/202.26 |
| 5,022,393 A | * | 6/1991 | McGrady et al. ....... 128/205.23 |
| 5,038,893 A | * | 8/1991 | Willner et al. ................ 184/7.4 |
| 5,051,729 A | * | 9/1991 | Gray ............................ 340/626 |
| 5,186,681 A | * | 2/1993 | Emmons ....................... 454/74 |
| 5,201,830 A | * | 4/1993 | Braswell .................. 244/118.5 |
| 5,273,486 A | * | 12/1993 | Emmons et al. .............. 454/74 |
| 5,297,424 A | * | 3/1994 | Sackett ....................... 73/146.5 |
| 5,318,018 A | * | 6/1994 | Puma et al. ............ 128/202.11 |
| 5,520,578 A | * | 5/1996 | Bloch et al. ................... 454/74 |
| 5,737,222 A | * | 4/1998 | Palmer ................. 364/424.013 |
| 5,791,982 A | * | 8/1998 | Curry et al. ................... 454/74 |
| 5,965,807 A | * | 10/1999 | Yamashita et al. ............ 73/129 |
| 5,967,461 A | * | 10/1999 | Farrington ................ 244/118.5 |
| 6,020,832 A | * | 2/2000 | Jensen ......................... 340/970 |
| 6,232,875 B1 | * | 5/2001 | DeZorzi ....................... 340/442 |

* cited by examiner

*Primary Examiner*—Toan Pham
(74) *Attorney, Agent, or Firm*—Duane Morris LLP

(57) ABSTRACT

A device for providing a plurality of indications of a select pressure, said device including: an electronic interface having an input and an output; a resistive structure adapted to measure the select pressure and being electrically coupled to the input of the electronic interface; a first output for providing a signal indicative of the select pressure, the first output being electrically coupled to the output of the electronic interface; and, a comparator coupled to the output of the electronic interface and being adapted to provide a signal indicative of whether the select pressure is greater than a predetermined threshold.

9 Claims, 5 Drawing Sheets

PRESSURE TRANSDUCER AND SWITCH COMBINATION

FIELD OF INVENTION

The present invention relates to pressure transducers and switches, and more particularly a combination assembly thereof.

BACKGROUND OF INVENTION

In many applications, for example aircraft and helicopter installations, the measurement of pressure is of vital importance. In such examplematic installations, examples of specific cases are the engine oil pressure and hydraulics. Typically this information is conveyed to a pilot in two redundant ways. One by means of a transducer and a cockpit indicator, the second by a pressure switch and a warning lamp. In this way, even if one system fails, the pilot will have enough information to correctly ascertain the present situation.

This arrangement proved necessary due to the low reliability of the older components used in the system: namely mechanical transducers, mechanical switches, indicators, lamps, wiring, etc. Modern systems improved the reliability in a significant way. One such example is the solid state piezorezistive pressure transducer, which has a significant better reliability and accuracy than the older mechanical Bourdon type potentiometer based transducers.

However, a weak link in this chain is the mechanical pressure switch. Although possible to be replaced by a solid state piezorezistive device and suitable electronics, most installations still use mechanical devices. One major reason for this is the fact that existing wiring provides only two conductors, while a solid state pressure switch requires at least an additional one for a constant supply voltage for the electronics.

The mechanical switches have another major disadvantage in that they are costly in the long run. Although individual mechanical switches are less expensive than a solid state piezorezistive transducer, due to a high failure rate, they must be replaced significantly more often than a transducer, resulting in significant costs in materials and labor.

Accordingly it is an object of the present invention, which is described below, to provide a convenient, reliable and cost effective new solution which does not require significant changes in the wiring of the plane, eliminates the unreliable mechanical switches and the associated high cost.

SUMMARY OF THE INVENTION

An apparatus including a first output and a second output for providing a pressure indication at the first output and the second output, which includes a resistive structure including a first terminal and a second terminal, for producing a pressure signal; an electronic interface including a set of input terminals coupled to the first terminal and the second terminal of the resistive structure, and an output at which a signal indicative of said pressure is produced in response to the pressure signal; a comparator arrangement including a first terminal coupled to the output of the electronic interface, and a second terminal coupled to a source representing a threshold, for comparing the pressure signal with the threshold, and for producing a pressure indication at the first output of the apparatus; an electronic buffer including an output forming the second output of the apparatus, and an input; and, a non-switched coupling path extending from the input of the buffer to the output of the electronic interface.

DESCRIPTION OF THE INVENTION

Figure 1:
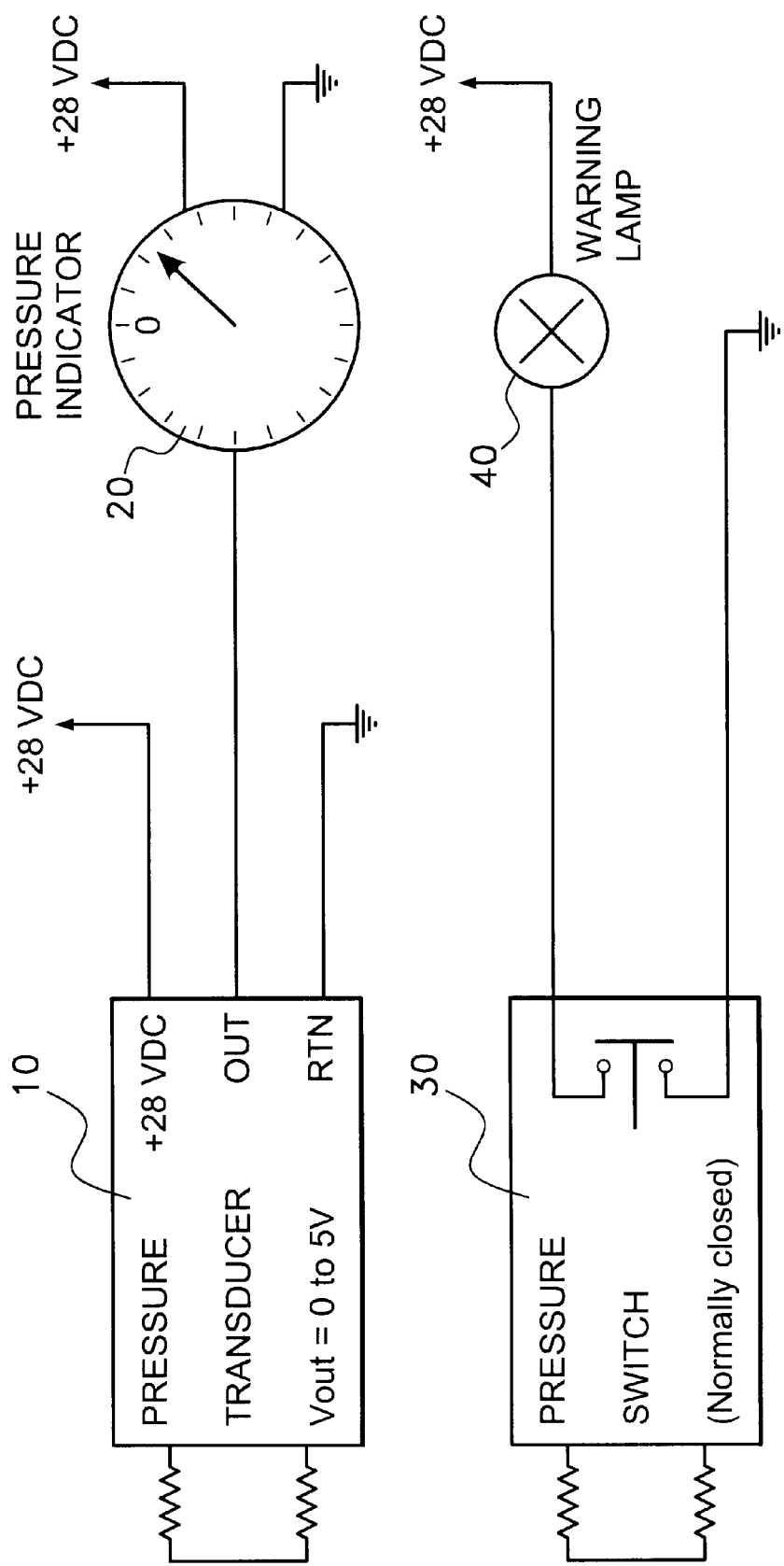
FIG. 1 illustrates a simplified diagram of a voltage output transducer presently utilized.
Figure 2:
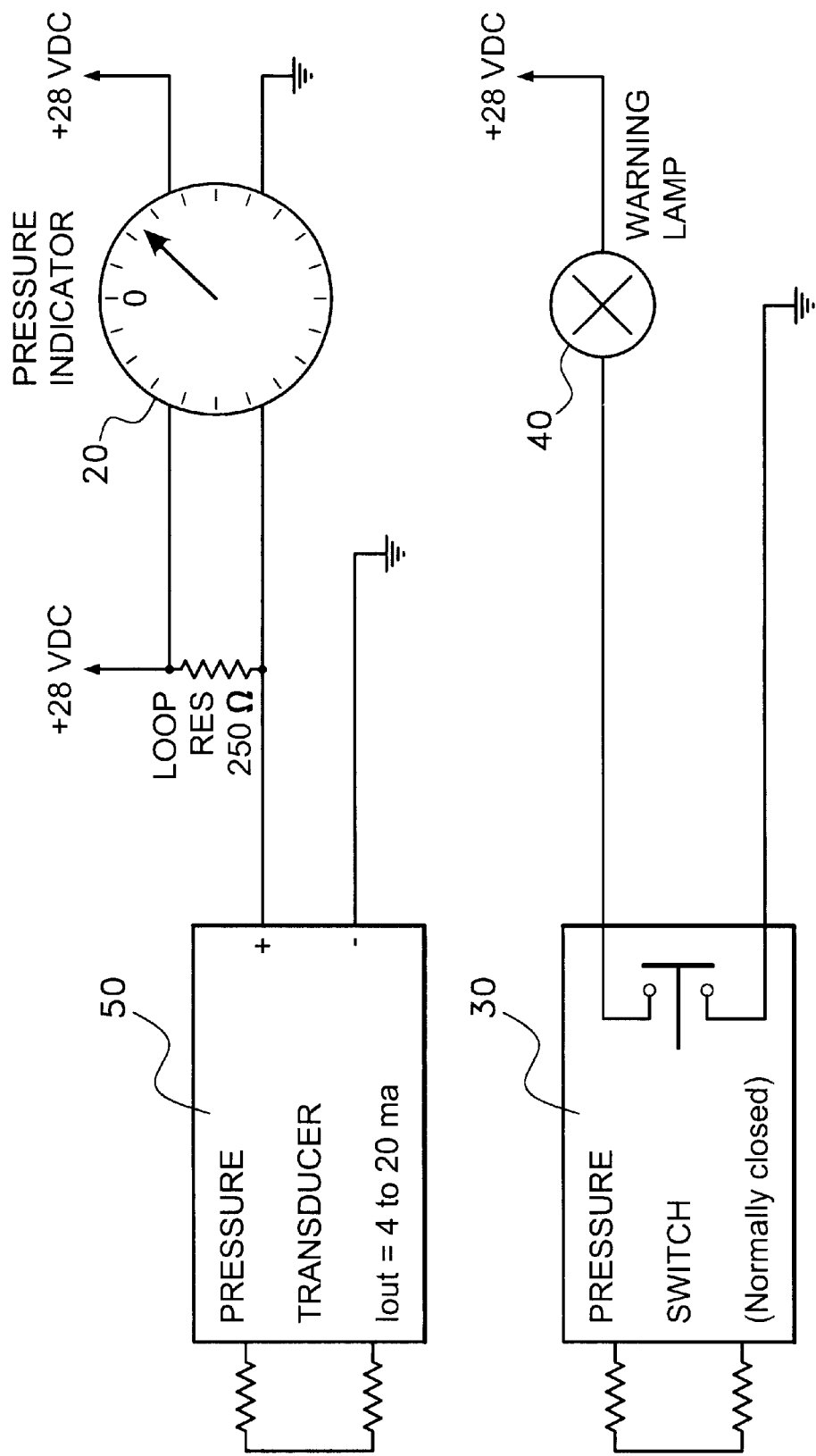
FIG. 2 illustrates a simplified diagram of a current output transducer presently utilized.

A simplified diagram of a voltage output transducer presently in use is illustrated in FIG. 1. Therein a pressure transducer 10 provides a 0–5 V signal which is displayed to a pilot using a pressure indicator 20. Further a pressure switch 30 (which is preferably normally-closed) provides a signal source to a warning lamp 40. A simplified diagram of a current output transducer presently in use is illustrated in FIG. 2. Therein a pressure transducer 50 provides a 4–20 mA signal which is displayed to a pilot using the pressure indicator 20. Further the pressure switch 30 (again, which is preferably normally-closed) provides a signal source to the warning lamp 40. In these ways the systems as illustrated in FIG. 1 and 2 can be seen to provide redundant information to a pilot.

Figure 3:
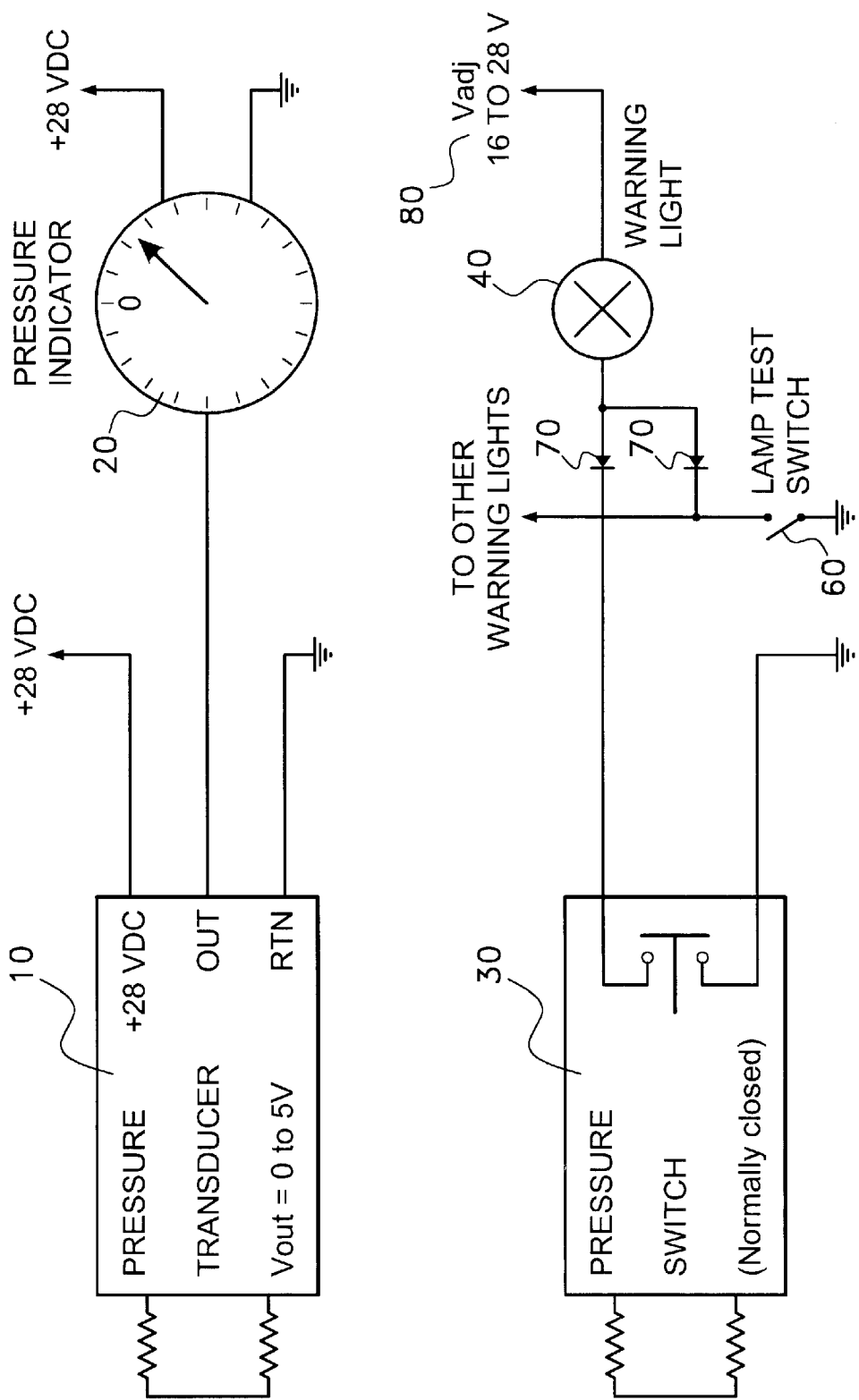
FIG. 3 illustrates a more complete illustration of the system of FIG. 1.

FIG. 3 illustrates a more complete schematic of the system of FIG. 1, wherein like references refer to like elements, and which includes a Lamp Test Switch 60, associated diodes 70, and an adjustable supply voltage 80 for the lamp(s) for dimming purposes. As is understood by those possessing ordinary skill in the art, a more detailed diagram for a current output transducer is similar.

Figure 4:
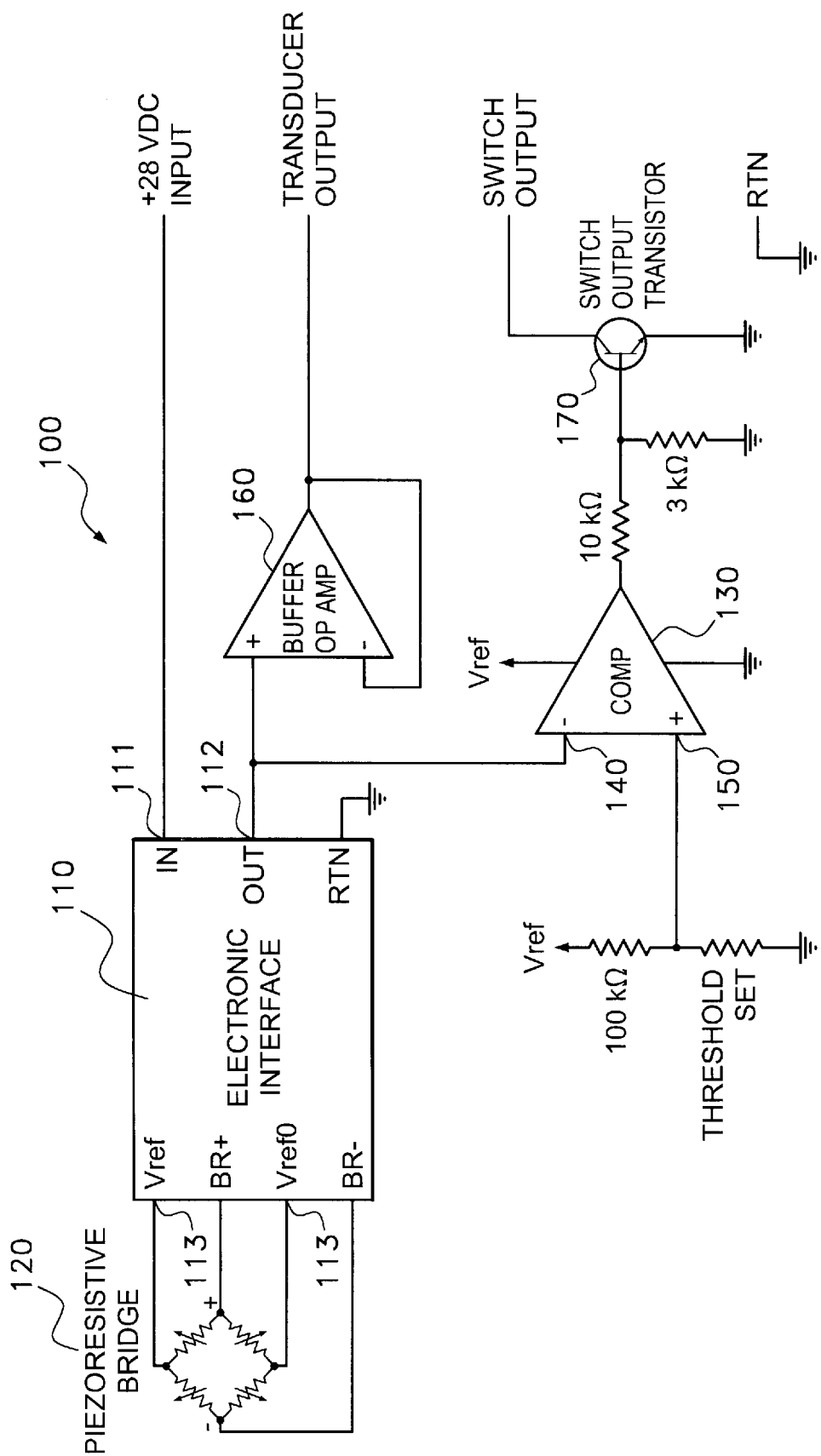
FIG. 4 illustrates a transducer/switch voltage-transducer combination according to the present invention.
Figure 5:
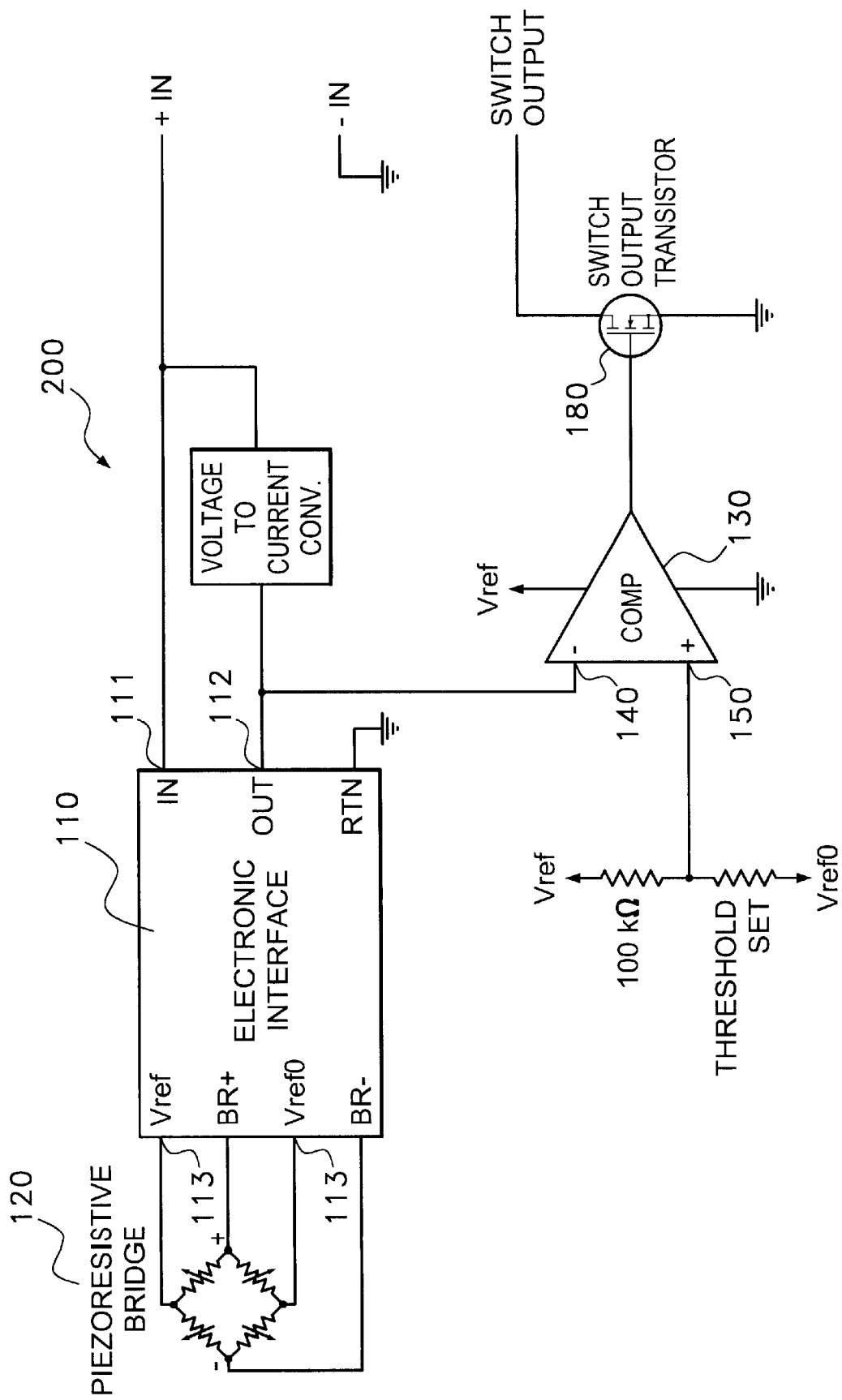
FIG. 5 illustrates a transducer/switch current-transducer combination according to the present invention.

The proposed invention of a transducer-switch combination is shown in FIG. 4 (voltage output transducer system 100) and FIG. 5 (current output transducer system 200). It combines the transducer and switch functions and electronics in one reliable unit. It makes use of the existing supply voltage present in the transducer to supply voltage to the switch circuitry. In the case of current output transducers, it also makes use of the high impedance piezorezistive bridge inherently needed for such design and low power associated electronics for the switch function.

The electronic interface 110 includes an input 111, a first output 112, and a second output 113. The electronic interface 110 is any of the configurations described in numerous previous patents, which are well know in the art. All have an inherent high level voltage which is used as an input 140 to a comparator 130. The other input 150 to the comparator 130 is an adjustable voltage which sets the switch trip point. An additional buffer op-amp 160 is provided in case of malfunction of the indicator (i.e. short circuit). Even in such instance the operation of the switch and lamp is not affected. Not shown in the drawings, but described in previous patents, are means of adjustment of the hysteresis. Such adjustment is particularly difficult or impossible for mechanical switches.

The current output devices, i.e. 4 to 20 mA sources, are extremely advantageous. This combination uses only three wires to implement both functions: transducer and switch.

The comparator 130 is preferably a very low power operational amplifier, e.g. a CMOS device. It is also possible to use a true comparator which already incorporates an open collector output. Using an operational amplifier makes the setting and/or adjustment of the hysteresis much easier.

The circuit described herein can be seen to provide significant advantages. For example, it adds very few components to existing transducer electronics, and all the added components have an extremely good reliability and relatively low cost. The overall reliability is therefore not less than the excellent reliability of the solid state piezorezistive transducer. Further, the cost of the new combination is almost the same as the cost of the transducer alone, while the switch and its associated high cost are eliminated. Further yet, the new system is fully compatible with existing aircraft wiring and associated functions (i.e. Lamp Test, dimming, etc.).

The proposed Pressure Transducer and Switch Combination may have different output configurations than those shown. FIG. 4 illustrates a bipolar NPN transistor open collector configuration 170, while FIG. 5 illustrates a N-channel MOSFET open drain output configuration 180. Also possible are high side switches (the FIGS. 4 and 5 show low side switches), normally-open switches, multiple trip point switches, etc.

Although the invention has been described in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

We claim:

1. An apparatus including a first output and a second output for providing a pressure indication at said first output and said second output, said apparatus comprising:

a resistive structure including a first terminal and a second terminal, for producing a pressure signal;

an electronic interface including a set of input terminals coupled to said first terminal and said second terminal of said resistive structure, and an output at which a signal indicative of said pressure is produced in response to said pressure signal;

a comparator arrangement including a first terminal coupled to said output of said electronic interface, and a second terminal coupled to a source representing a threshold, for comparing said pressure signal with said threshold, and for producing a pressure indication at said first output of said apparatus;

an electronic buffer including an output forming said second output of said apparatus, and an input; and, a non-switched coupling path extending from said input of said buffer to said output of said electronic interface.

2. The apparatus of claim 1, wherein said resistive structure comprises a plurality of piezoresistive devices coupled in a wheatstone bridge configuration.

3. The apparatus of claim 1, wherein said buffer is an op-amp.

4. The apparatus of claim 1, further comprising a transistor coupled to said output of said comparator arrangement.

5. The apparatus of claim 4, wherein said comparator arrangement includes a comparator, including first and second inputs and an output, wherein said first input of said comparator is coupled to said output of said electronic interface and said output of said comparator is coupled to said transistor.

6. The apparatus of claim 5, wherein said transistor is coupled to a means for indicating when said signal indicative of whether said select pressure drops below a predetermined threshold.

7. The apparatus of claim 6, wherein said second input of said comparator is coupled to an adjustable voltage being associated with said predetermined threshold.

8. The apparatus of claim 1, wherein said apparatus is used in an aircraft for indicating a pressure.

9. The apparatus of claim 8, wherein said apparatus replaces a mechanical pressure switch present in the aircraft.

* * * * *